(12) United States Patent
Carlson et al.

(10) Patent No.: US 6,292,188 B1
(45) Date of Patent: Sep. 18, 2001

(54) SYSTEM AND METHOD FOR NAVIGATING IN A DIGITAL INFORMATION ENVIRONMENT

(75) Inventors: Samuel Garrett Carlson, New York; John Franklin Sharp, Brooklyn, both of NY (US)

(73) Assignee: Alltrue Networks, Inc., New York, NY (US)

( * ) Notice: Subject to any disclaimer, the term of this patent is extended or adjusted under 35 U.S.C. 154(b) by 0 days.

(21) Appl. No.: 09/362,429

(22) Filed: Jul. 28, 1999

(51) Int. Cl.[7] ........................................................ G06F 3/00
(52) U.S. Cl. ........................ 345/357; 345/341; 345/352; 345/356; 345/353; 707/501
(58) Field of Search .................................. 345/357, 341, 345/352, 356, 348, 353; 707/501, 513, 514

(56) References Cited

U.S. PATENT DOCUMENTS

| | | | |
|---|---|---|---|
| 5,572,643 | * 11/1996 | Judson | 707/514 |
| 5,801,702 | * 9/1998 | Dolan et al. | 345/357 |
| 5,802,334 | * 9/1998 | Nickolas et al. | 345/357 |
| 5,890,172 | * 3/1999 | Borman et al. | 707/501 |
| 5,903,267 | * 5/1999 | Fisher | 345/341 |
| 5,937,419 | * 8/1999 | Oshiro et al. | 707/514 |
| 6,035,330 | * 3/2000 | Astiz et al. | 345/357 |

* cited by examiner

*Primary Examiner*—Raymond J. Bayerl
*Assistant Examiner*—Cuong T. Thai
(74) *Attorney, Agent, or Firm*—Brown Raysman Millstein Felder & Steiner LLP

(57) ABSTRACT

The present system and method is directed to an interactive navigation system and method for exploring or browsing digital content data that can be spatially structured such that content pages can be located relative to one another. Once a page arrangement layout is completed, a navigation bar in conjunction with an underlying scrolling engine allow fast access to any section of the information space while maintaining an intuitively correct spatial metaphor. Thus, as the user manipulates the navigation bar, the scrolling engine moves the user to the new information content area in a visually intuitive manner while the intermediate content is displayed on a screen.

18 Claims, 10 Drawing Sheets

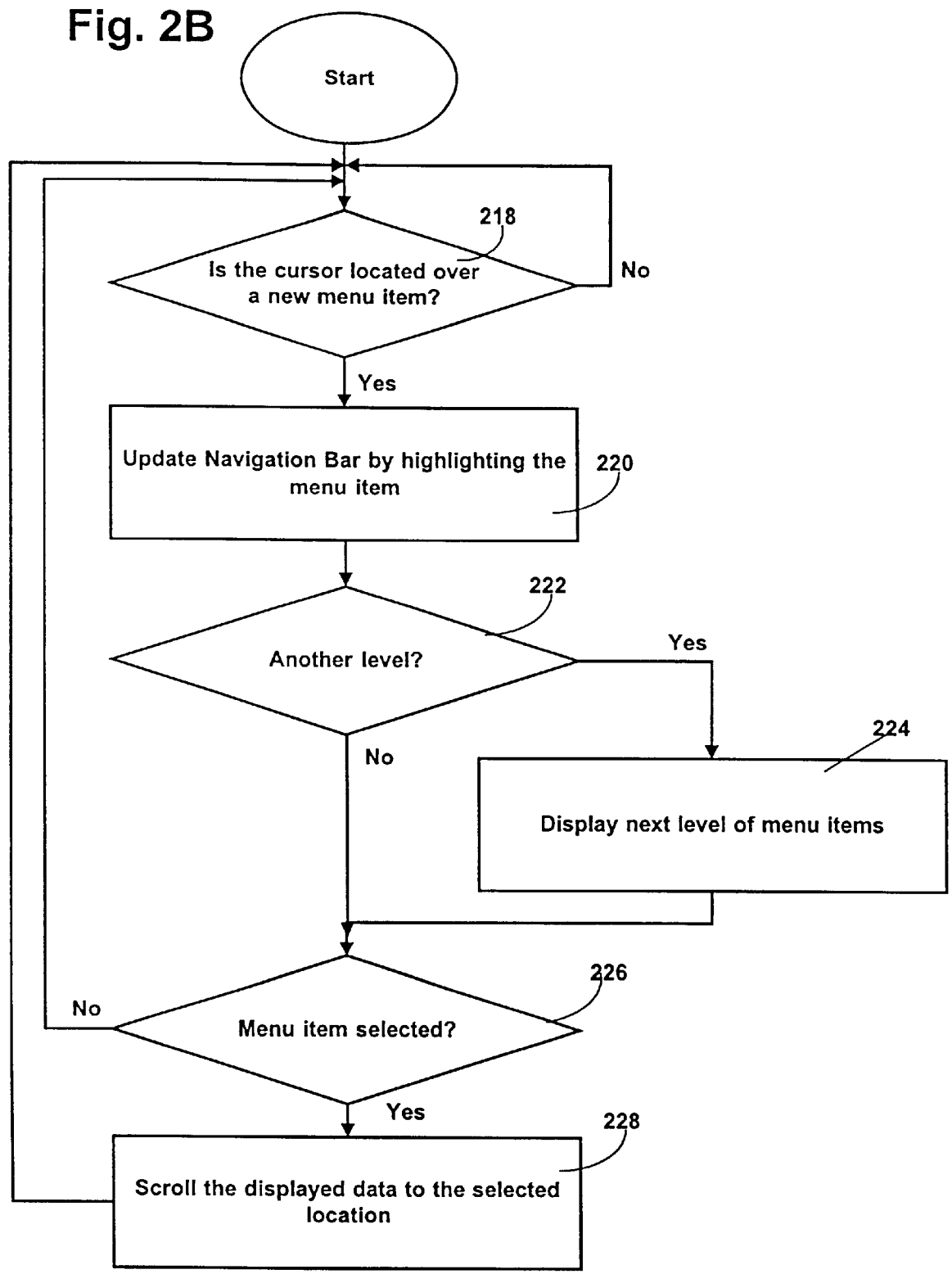

Fig. 3

| (1,1)<br><br>Content Page | (1,2)<br><br>History | (1,3) | (1,4)<br><br>Projects | (1,5) | (1,6) | (1,7) |
|---|---|---|---|---|---|---|
| (2,1)<br><br>Intro | (2,2)<br><br>Company | (2,3)<br><br>Digital | (2,4)<br><br>Television | (2,5)<br><br>Film | (2,6)<br><br>Theater | (2,7)<br><br>Press |
| (3,1) | (3,2)<br><br>Strategies | (3,3) | (3,4)<br><br>Strategies | (3,5) | (3,6) | (3,7) |
| (4,1) | (4,2)<br><br>Bios | (4,3)<br><br>Bios | (4,4)<br><br>Bios | (4,5)<br><br>Bios | (4,6) | (4,7) |
| (5,1) | (5,2)<br><br>Press | (5,3) | (5,4)<br><br>Press | (5,5) | (5,6) | (5,7) |

302 — table
312 — Content Page
Cell 314

SYSTEM AND METHOD FOR NAVIGATING IN A DIGITAL INFORMATION ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention relates generally to computer interface design and graphical user interfaces (GUIs). More particularly, the present invention relates to a system and method for navigating in digital information environments, such as websites on the World Wide Web portion of the Internet or other information collections.

Navigation tools are crucial for accessing digital information. Menu systems and hot links are examples of navigation tools for moving from one area to another in a digital information environment. However, existing navigation tools do not necessarily have a direct spatial relationship to the underlying content data. Since the structure of the content data is not visible, the user typically cannot ascertain how the displayed portion of the content data (a page in the website, for example) relates to the entire content data space (the website).

Pull-down menu systems exemplified by the APPLE MACINTOSH® and MICROSOFT WINDOWS® graphical environments are well known to those skilled in the art. Although many pull-down menu systems are hierarchical, there is no spatial relationship to the underlying information structure.

A need therefore exists for a system and method that address the above concerns and overcome the disadvantages of conventional information navigation systems.

BRIEF SUMMARY OF THE INVENTION

It is an object of the present invention to provide a spatially intuitive information navigation system and method for browsing digital content data.

It is another object of the present invention to provide a multi-level menu and navigation system that corresponds to a spatial metaphor for accessing digital content data.

It is still another object of the present invention to provide a scrolling system and method that displays intermediate views of the digital content data such that the user is given an intuitive feeling of moving through the information to reach the point at which their selected content data is located.

It is still another object of the present invention to provide an information navigation tool that allows faster, more efficient access to content data.

It is still another object of the present invention to provide an information navigation tool that helps the user to better understand and comprehend the content data that is being reviewed and the context in which it is situated.

It is still another object of the present invention to provide an information navigation system that allows content authors and providers a particular method for formatting and packaging content data.

It is still another object of the present invention to provide a method of background information transfer over a computer network such that large units of content data are available for rapid, direct access using the navigation system and method discussed above.

It is still another object of the present invention to provide a pleasing interface and interaction method that is enjoyable for a user to operate.

The above and other objects are achieved by a computer-implemented method for navigating a website on the Internet, where the website includes a plurality of content pages for display on a display screen. According to the method, a graphical object comprising a plurality of first-level items is displayed. Each first-level item is associated with a respective first-level page, and at least one first-level item comprises a plurality of second-level items associated with a plurality of second-level pages. Further according to the method, a first-level item of the graphical object is selected such that a first-level page associated with the first-level item is displayed on the display screen. Further according to the method, a move is carried out from the first-level item to another first-level item of the graphical object such that another first-level page associated with that another first-level item is displayed on the display screen and such that the graphical object remains displayed on the display screen.

In accordance with one aspect of the present invention, other first-level items located between the first-level item and that another first-level item of the graphical object are traversed at a predetermined speed during the step of moving.

In accordance with another aspect of the present invention, the method includes scrolling on the display screen the respective first-level pages corresponding to the other first-level items during the moving operation.

BRIEF DESCRIPTION OF THE DRAWINGS

The present invention is illustrated in the figures of the accompanying drawings which are meant to be exemplary and not limiting, in which like reference characters are intended to refer to like or corresponding parts, and in which:

FIG. 2B shows a functional flowchart describing, in more detail, the operation of navigation bar code and scrolling engine code according to the present invention;

FIG. 3 shows a block diagram of the data structure for a representative digital information space, arranged as a matrix, for use in the present invention;

DETAILED DESCRIPTION OF THE PREFERRED EMBODIMENTS

On the World Wide Web portion of the Internet, an individual unit of data, which is not limited as to size or type of data in this disclosure, is referred to as a "content page". A collection of content pages, oriented relative to each another in a particular spatial structure, is referred to as an "information space". As an example, a website typically includes a number of pages of varying length which may contain various types of data. The entire website or selected portion thereof is an information space, and a single page or selected portion thereof is a content page. Thus, an information space is a collection of content pages of digital data that has an underlying spatial structure.

As a general overview, the present invention is directed to an interactive navigation system and method for browsing digital content data. The inventive system and method are for use in navigating within a spatially structured information space in which content pages are located relative to one another. Such spatial structure of content pages are automatically constructed from the downloaded data, for example, according to one aspect of the present invention. For example, one spatial structure of content pages may be a sequence of pages, one after another. In the preferred embodiment, the information space is structured as a two dimensional matrix of cells, where each cell contains a content page. Once a spatial structure of content pages is established, a navigation bar and a page scrolling engine provide easy access to any content page in the information space while maintaining an intuitively correct spatial metaphor.

Figure 1:
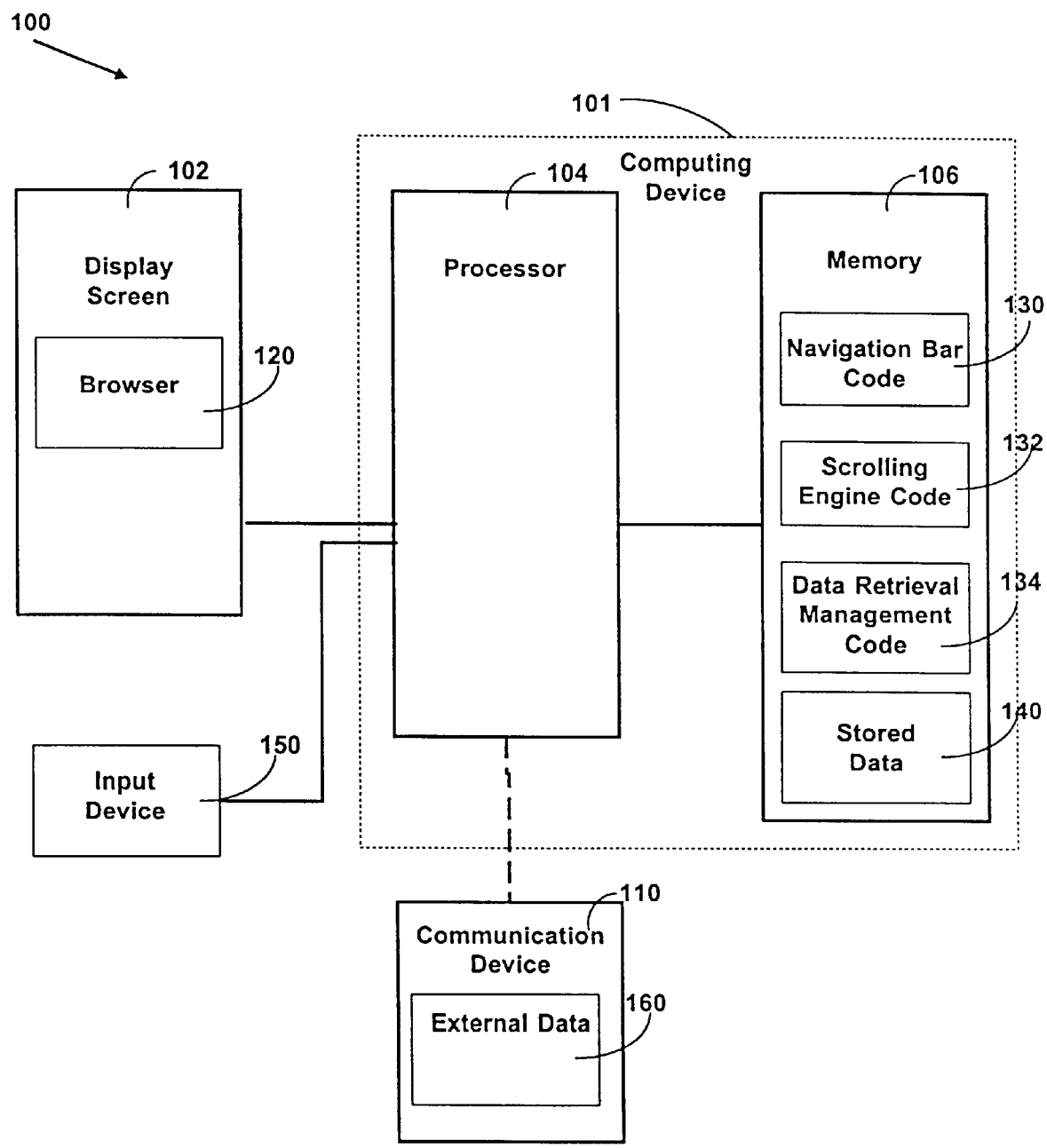
FIG. 1 shows a block diagram of a general-purpose computer for use in the information navigation system and method in accordance with the present invention.

The present invention will now be described in detail with reference to the drawings. FIG. 1 is a block diagram of computer-related architecture for use in the information navigation system and method of the present invention. Shown in FIG. 1 is computing environment 100 comprising a computing device 101 which may be a general-purpose computer or application-specific computer, display screen 102, input device 150, and communication device 110. The computing device 101 includes a programmable controller, such as processor 104, and memory 106. Under the control of processor 104 executing appropriate instructions, the computing device 101 controls the input device 150, which may be a mouse, pen, keyboard, touch screen, etc., for entering and manipulating data (text or video) and the display screen 102 for displaying the entered text or video data.

Further under the control of processor 104 executing appropriate instructions, the computing device 101 retrieves external data 160, such as the contents of website, via the communication device 110 which may be a dial-up modem, a network interface card, etc.

In the preferred embodiment of the present invention, browser 120, such as NETSCAPE COMMUNICATOR® or INTERNET EXPLORER®, is displayed on the display screen 102 in response to the execution of appropriate instructions by the processor 104, as illustrated in FIG. 1. As well known to those skilled in the art, the browser 120 provides an interface between the user and the computing device 101 for processing website data residing on a server, for example. The browser implementation may be carried out by an applet program written in a programming language DHTML, for example. The applet is downloaded to the computing device 101 and is executed by the processor 104.

Continuing with reference to FIG. 1, the memory 106 contains navigation bar code 130, scrolling engine code 132 and data retrieval management code 134. The processor 104 executes the respective code for performing various operations described in detail below. The functions carried out by executing the above code portions may be implemented as separate, interacting programs or as functional modules within a single program. The processor 104 manipulates stored data 140 contained in the memory 106 and displays the data on the display screen 102.

Further referring to FIG. 1, the processor 104 may request data from external sources such as a server on the Internet by appropriate calls to the communication device 110. In the preferred embodiment, a web site is downloaded to the memory 106 in its entirety and then processed locally by the computing device 101.

Figure 2A:
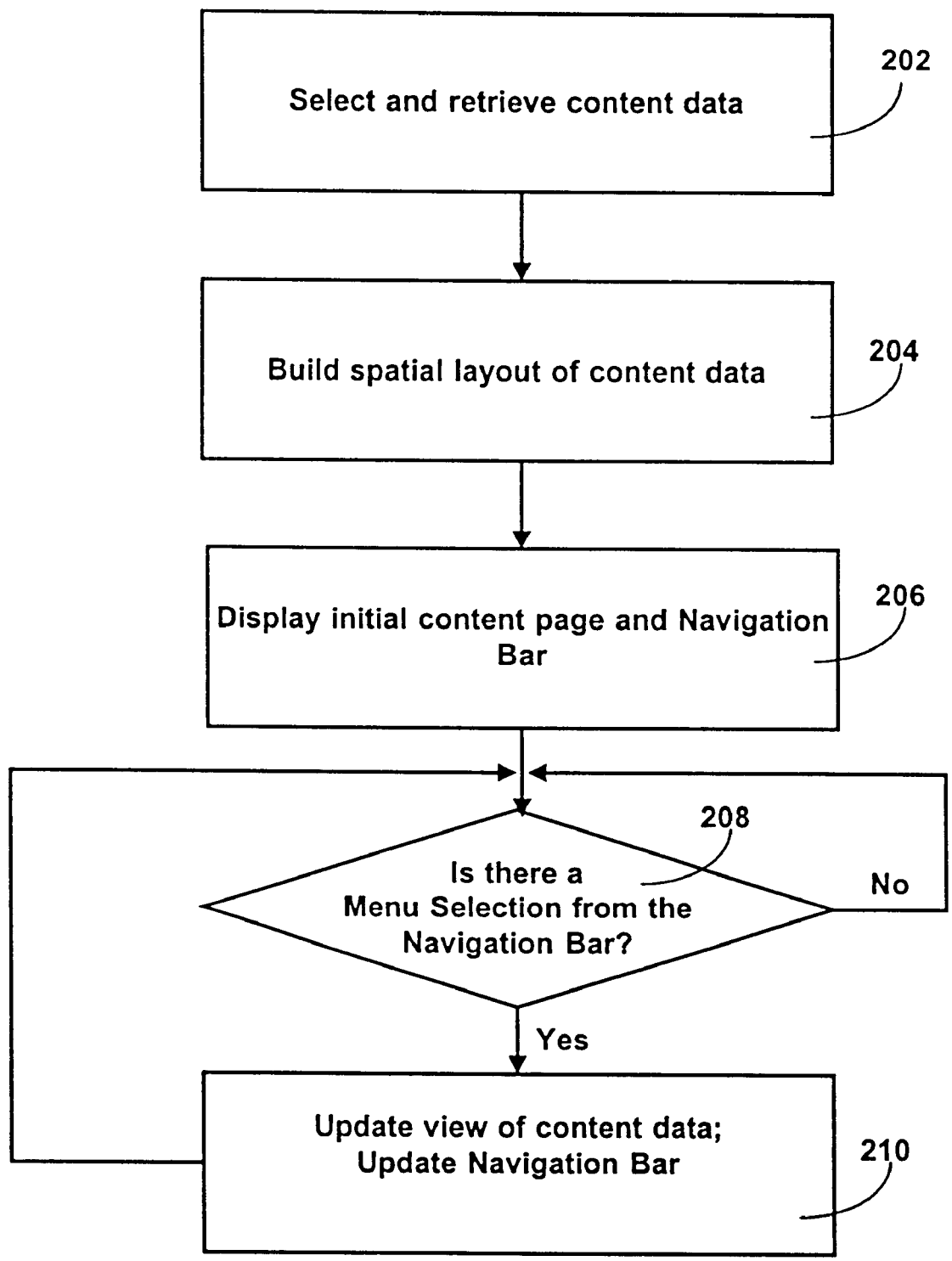
FIG. 2A shows a functional flowchart of the overall operation of the information navigation system in accordance with the present invention.

The operation of the present invention will now be described with reference to the figures. FIG. 2A is a functional flowchart of the overall operation of the information navigation system in accordance with the present invention. In step 202, the user controls the processor 104 to select and retrieve data, such as a web site containing a number of content pages. According to the preferred embodiment of the present invention, the information space is retrieved from the Internet and stored locally in the memory 106 under the control of the processor 104. The content pages are then processed in step 204 to build a spatial structure of the retrieved data. As mentioned above, in the preferred embodiment of the present invention, the structure is implemented as a two-dimensional matrix of cells, with each cell containing a content page and the entire matrix representing the information space. In step 206, an initial content page is displayed on the display screen 102 in response to the instruction code executed by the processor 104. The initial content page may be specified by a content author or selected as a default page to be any matrix cell. Also in step 206, a navigation bar is displayed. Initially, the navigation bar includes one row and/or one column of menu items, where each menu item corresponds to a cell in the matrix.

Further with reference to FIG. 2A, at step 208 the processor 104 determines whether an item of the navigation bar is selected by the user. If there is a menu selection such as a mouse click for example, the processor 104 executes the scrolling engine code 132 to scroll the display of the content page in step 210. Also executed by the processor 104 is the navigation bar code 130 in step 210 to update the display of the navigation bar. After completing these operations, the processor 104 returns to step 208 to await another menu selection.

FIG. 2B is a functional flowchart describing, in more detail, the operation of the navigation bar code and the scrolling engine code in steps 208, 210 of FIG. 2A according to the present invention. After displaying the initial content page and navigation bar as described above, the processor 104 checks in step 218 if a pointer, controlled via the input device 150, has moved to a new position that corresponds to a new menu item of the navigation bar. If, as a result of the user clicking a mouse or alternatively simply resting the pointer on a new item of the navigation bar, the pointer points to a new location, then the navigation bar is updated on the display screen 102 by distinguishing the new item on the navigation bar in step 220. In one embodiment of the present invention, the new item is highlighted to designate the current location.

As the pointer "clicks" or moves over different menu items on the navigation bar, the sub-menu corresponding to that menu item may be displayed if present. Thus, in step 222 the processor 104 determines whether another level of menu, a sub-menu, is associated with the menu item indicated by the user. If so, the next level of menu items, the sub-menu, is displayed in step 224. The navigation bar, as described in greater detail below, displays alternating vertical and horizontal sub-menus. If the navigation begins by displaying a vertical menu, then the next sub-menu display level will be horizontal and the following vertical, proceeding further in an alternating pattern of horizontal and vertical.

Next, the processor 104 checks in step 226 if the menu item is selected via a mouse click, for example. If so, the processor 104 is operative to scroll to the selected location in the information space such that the selected content page is displayed on the display screen 102 in step 228, and all intermediate content between the two pages is displayed.

The speed of the scrolling operation is controlled in a predetermined manner. Namely, the scrolling operation may be either continuous or may be accomplished in a fixed number of steps which may be taken either at a fixed distance or may be adaptive. In the adaptive implementation, it appears that the scrolling "speeds up" as it starts then "slows down" as it reaches the destination location (cell in the matrix).

During the scrolling operation, the intermediate pages are displayed on the display screen 102 depending on the pre-selected speed. For example, if the scrolling operation is continuous, then every intermediate page between the current page and destination page is displayed during the scrolling operation. In another embodiment of the present invention, the speed is set to a fixed number of display portions, such as 4. In this case, only four selected pages, if there are more than four intermediate pages, or 4 portions of a page, if there is only one intermediate page, are displayed during the scrolling operation.

FIG. 3 shows a block diagram of information space 302 which is a collection of content pages as described above. In the preferred embodiment, the content pages are arranged and stored in cells of a matrix in the memory 106. The size of the matrix is determined by the number of pages in the website, having the dimensions of the longest row and column of sub-menu items. For example, in FIG. 3 the second and fourth columns have 5 menu items that correspond to content pages of the website, and the second row contains 7 menu items corresponding to content pages of the website. Thus, the size of the matrix is 5 rows by 7 columns. Depending on the quantity of the website data, each cell 314 either contains a content page 312 or is empty. For reference purposes, cells are indexed by the row and column numbers. For example, the top, left-most cell is identified by the index (1,1) as shown in FIG. 3.

Figure 4A:
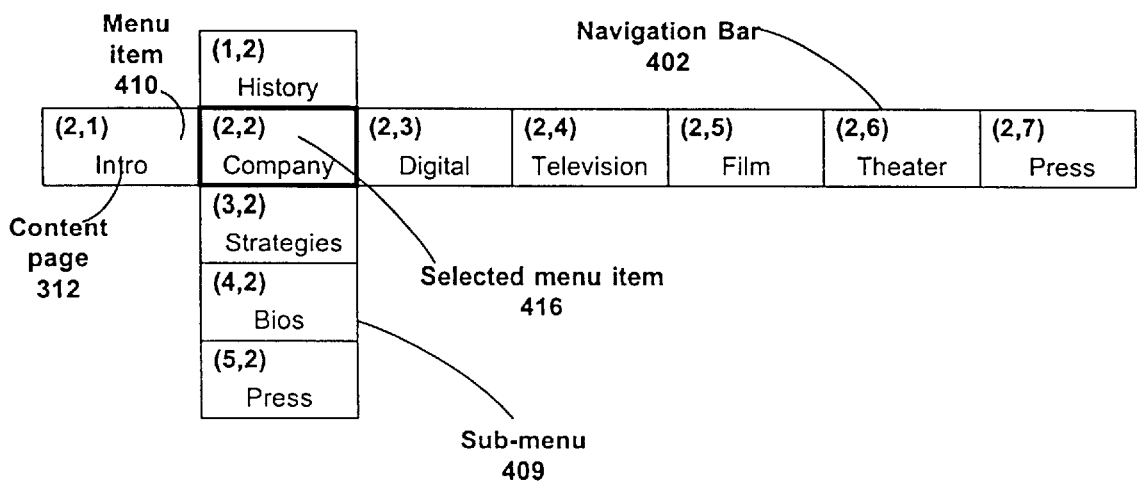
FIG. 4A shows a block diagram of the navigation bar with the first and second levels of menu items activated.

FIG. 4A shows a block diagram of navigation bar 402 with the first and second levels of menu items activated. The navigation bar 402 contains menu items 410 representatively labeled with text strings "Intro", "Company", "Digital", "Television", "Film", "Theater", and "Press". The displayed menu items 410 are associated with their respective content pages 312 arranged in the matrix of FIG. 3 as described above.

The navigation bar 402, shown in FIG. 4A, is at its predetermined initial state. As further illustrated in FIG. 4A, the user-selected menu item 416 is "Company" which contains a sub-menu of items associated therewith. That is, the first-level items are located on the navigation bar 402. As soon as a first-level item with a submenu, such as "Company" for example, is referenced or selected by the user, the second 4level items of the sub-menu 409 are displayed on the display screen 102. The displayed sub-menu 409 of FIG. 4A is associated with the selected menu item 416.

Figure 4B:
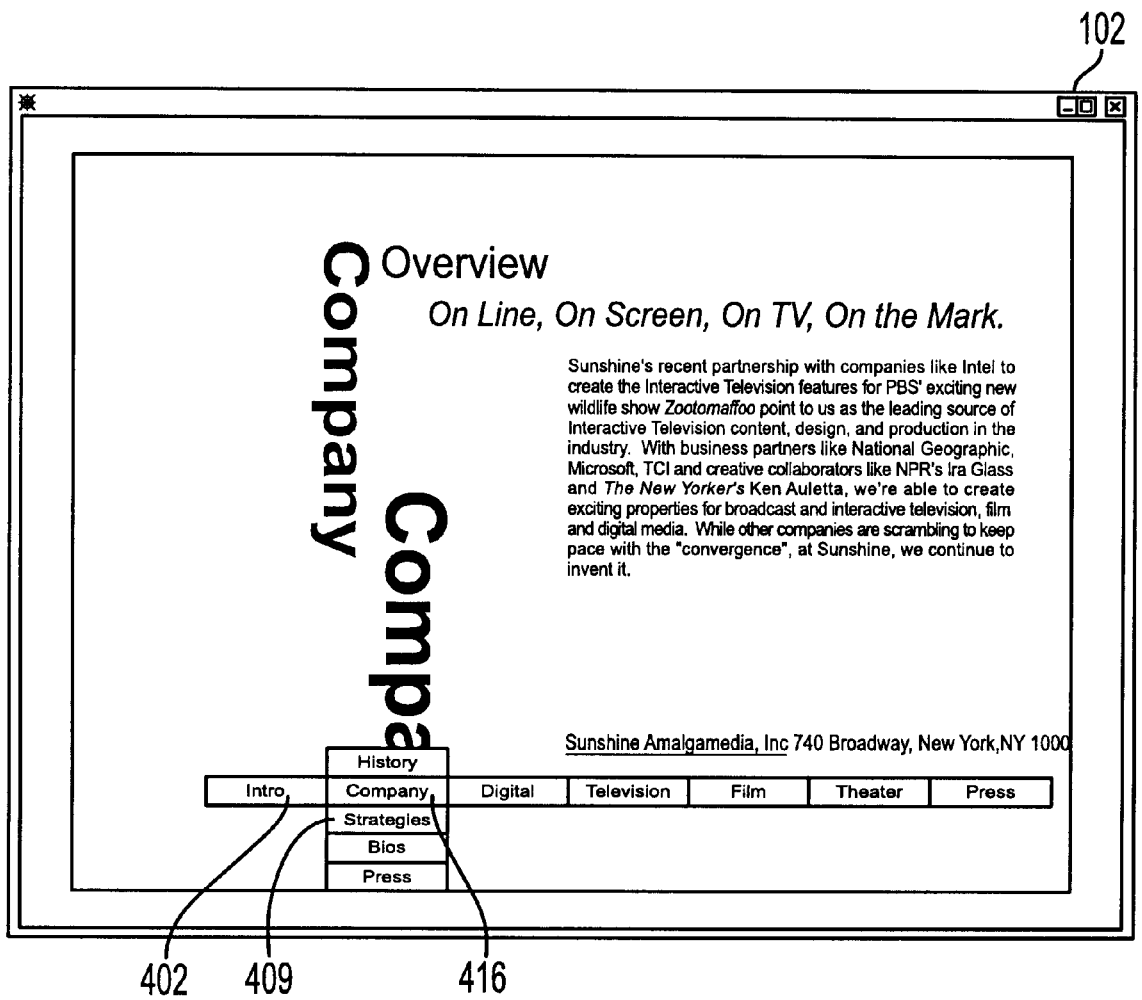
FIG. 4B shows a display screen displaying sample content data and the navigation bar with menu items activated in correspondence with FIG. 4A.

FIG. 4B shows the display screen 102 displaying a representative content page and the navigation bar 402 overlaying the displayed content page, with the first level of menu items and the sub-menu 409 corresponding with FIG. 4A. The browser 120 is activated to display the selected menu item 416 highlighted on the display screen 102 to identify current location on the navigation bar 402. It is worth noting that the displayed menu items, shown in block diagram form of FIG. 4A and shown in actual display of FIG. 4B, correspond with the second row and second column of the information space 302 of FIG. 3.

Figure 5A:
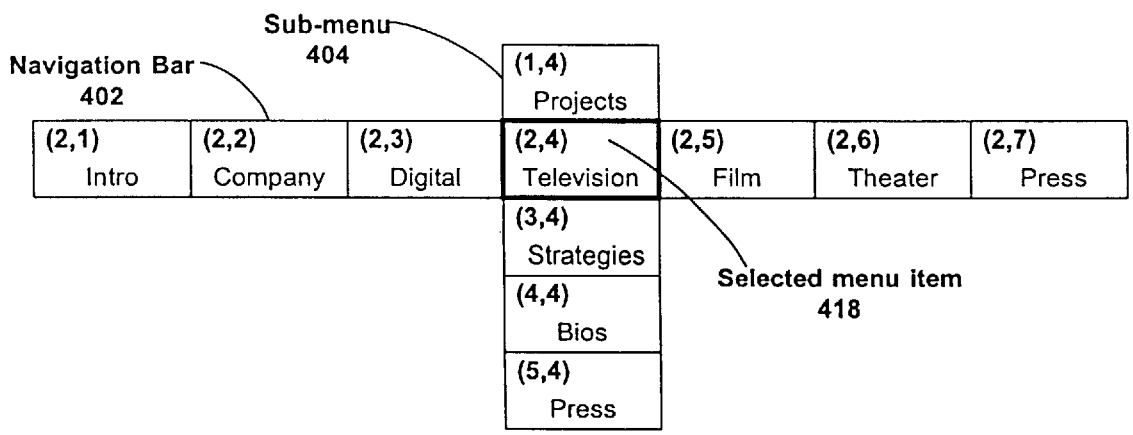
FIG. 5A shows a block diagram of the navigation bar with another first and second levels of menu items activated.

In FIG. 5A, the navigation bar 402 is shown with another second-level menu items activated. In particular, menu item 418 labeled "Television" is selected in response to the user moving the pointer to that location or "clicking" on the desired item. Based on the activation of the selected menu item 418, sub-menu 404 is displayed as shown in FIG. 5A. The second level menu items are displayed vertically, with each menu item corresponding to a respective content page of the information space 302 described above.

Figure 5B:
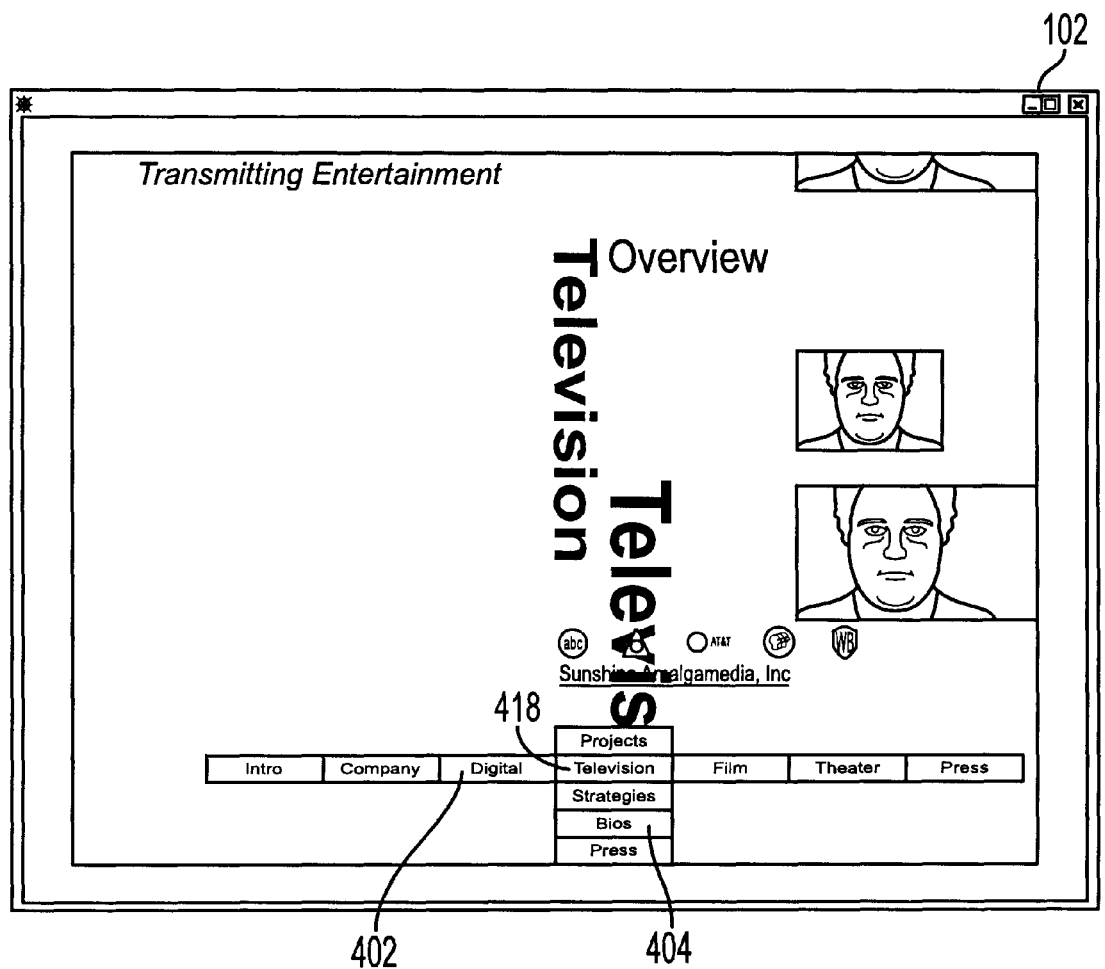
FIG. 5B shows a display screen displaying sample content data and the navigation bar with menu items activated in correspondence with FIG. 5A.

In correspondence with FIG. 5A, FIG. 5B shows the display screen 102 displaying another representative content page different from the one in FIG. 4B. Also shown in FIG.5B is the navigation bar 402 appearing to overlay the displayed content page. The browser 120 is activated to display the sub-menu 404 and the selected menu item 418 which is highlighted on the display screen 102 to identify current location on the navigation bar 402. It is worth noting that the displayed menu items, shown in block diagram form of Fig. SA and shown in actual display of FIG. 5B, correspond with the second row and fourth column of the information space 302 of FIG. 3.

Figure 6A:
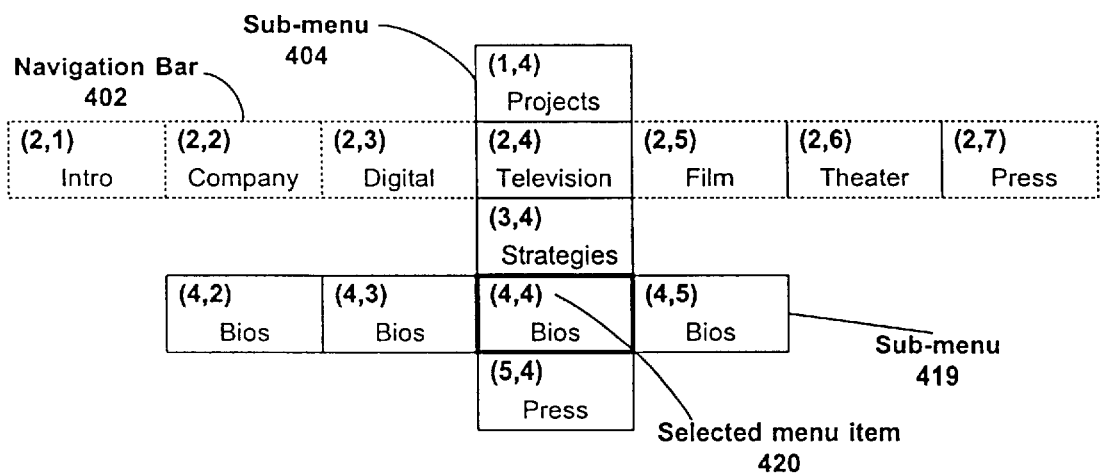
FIG. 6A shows a block diagram of the navigation bar with three levels of menu items activated.

FIG. 6A shows a block diagram of the navigation bar with three levels of menu items activated, and in particular, shows the selected menu item 420 labeled "Bios" in response to the user moving the pointer to the corresponding location and/or "clicking" on the navigation bar 402. Also shown in FIG. 6A are the sub-menu 404 and another sub-menu 419 activated on the display screen 102 in response to the selected menu item 420. The third-level menu items are displayed horizontally, with each menu item corresponding to a respective content page of the information space 302 described above.

Figure 6B:
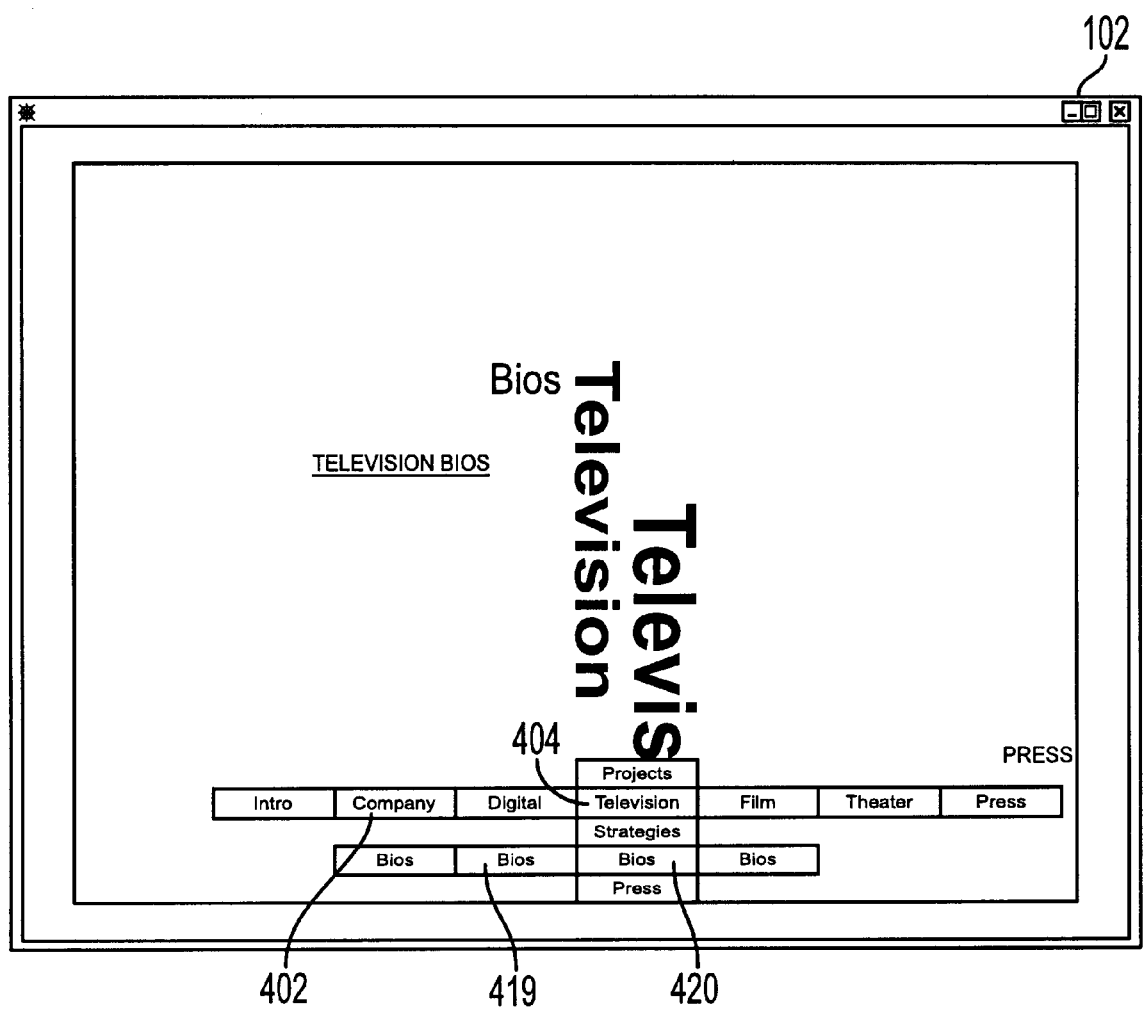
FIG. 6B shows a display screen displaying sample content data and the navigation bar with menu items activated in correspondence with FIG. 6A.

In correspondence with FIG. 6A, FIG. 6B shows the display screen 102 displaying another representative content page different from the ones in FIGS. 4B and 5B. Also shown in FIG. 6B is the navigation bar 402 overlaying the displayed content page. The sub-menu 404 and sub-menu 419 are displayed, and the selected menu item 420 is highlighted on the display screen 102 to identify current location on the navigation bar 402. The displayed menu items, shown in block diagram form of FIG. 6A and shown in actual display of FIG. 6B, correspond with the second and fourth rows and fourth column of the information space 302 of FIG. 3.

Figure 7A:
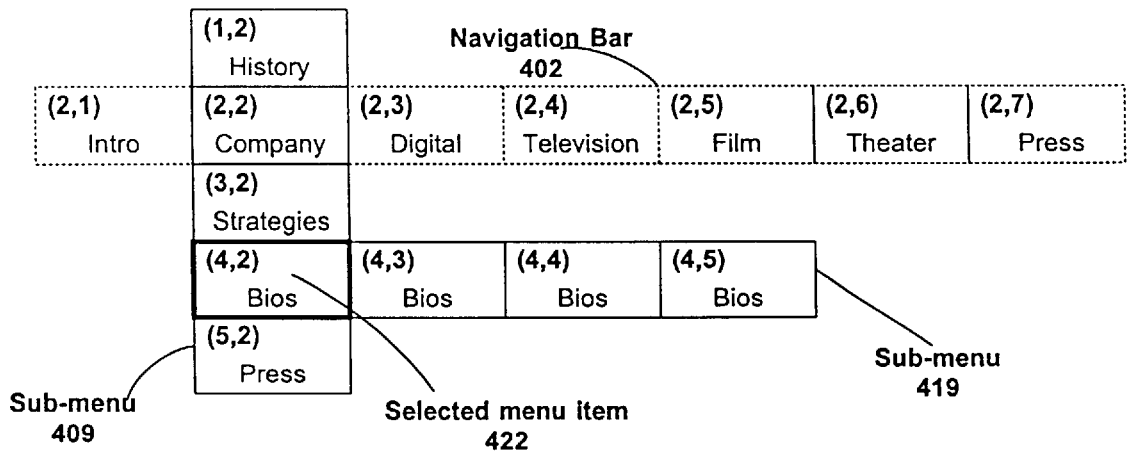
FIG. 7A shows a block diagram of the navigation bar with another three levels of menu items activated.

FIG. 7A shows a block diagram of the navigation bar with another three levels of menu items activated. In particular, shown in FIG. 7A is the selected menu item 422 labeled "Bios" in response to the user moving the pointer to the corresponding location on the navigation bar 402. Also shown in FIG. 7A are the sub-menus 409 and 419 activated on the display screen 102 in response to the selected menu item 422. Each menu item corresponds to a respective content page of the information space 302 described above.

Figure 7B:
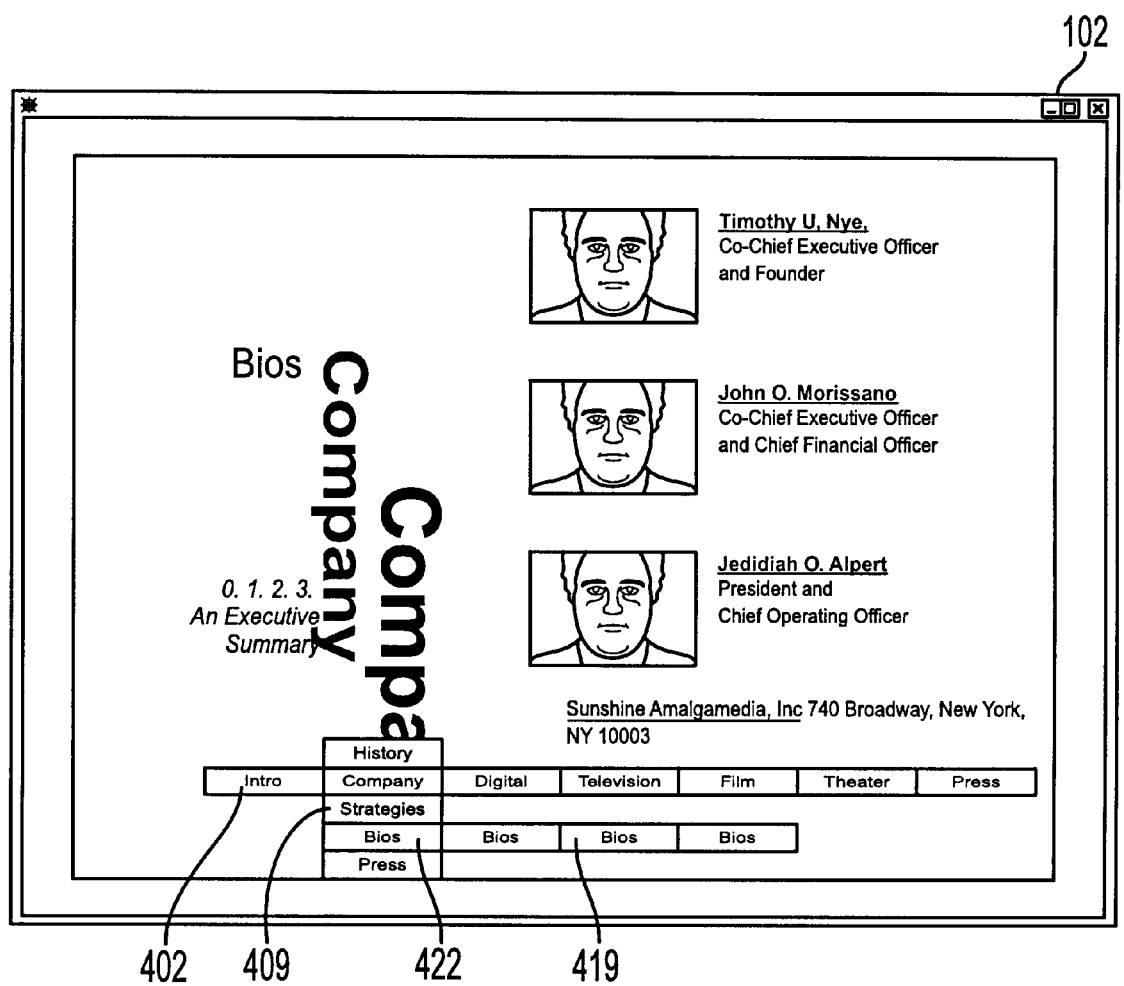
FIG. 7B shows a display screen displaying sample content data and the navigation bar with menu items activated in correspondence with FIG. 7A.

In correspondence with FIG. 7A, FIG. 7B shows the display screen 102 displaying another representative content page different from the ones in FIGS. 4B, 5B and 6B. Also shown in FIG. 7B is the navigation bar 402 overlaying the displayed content page. The sub-menus 409 and 419 are displayed, and the selected menu item 422 is highlighted on the display screen 102 to identify current location on the navigation bar 402. The displayed menu items, shown in block diagram form of FIG. 7A and shown in actual display of FIG. 7B, correspond with the second and fourth rows and second column of the information space 302 of FIG. 3.

With respect to the figures, the direct correspondence between the menu items and the information space 302 may be noted For example, using the addressing nomenclature of (X, Y) coordinates, there is a one-to-one mapping between the menu items and the information space 302. Thus, the navigation bar 402 provides an index into the information space 302. In the preferred embodiment, an address mapping formula is used to calculate an offset from the currently displayed content page to the destination content page in the information space 302 based on the coordinates obtained from the navigation bar 402. The address mapping formula for calculating an offset is as follows:

$$Y_{offset} = Y_{dest} - Y_{curr} \tag{1}$$

$$X_{offset} = X_{dest} - X_{curr} \tag{2}$$

In the preferred embodiment, the offset in the vertical direction is calculated first such that the scrolling operation is performed in the Y-direction while displaying the corresponding pages in a process. Then, the horizontal offset is calculated, and the scrolling operation proceeds in the horizontal direction with the corresponding pages displayed accordingly. Those skilled in the art will recognize that the present invention is not limited to such implementation, and other scrolling methods for reaching the destination page are encompassed by this disclosure.

In addition, the navigation bar 402 is displayed horizontally on the display screen 102. It is understood by those skilled in the art that the orientation of the navigation bar 402 and various sub-menus may be changed without departing from the scope and spirit of the invention.

Further in the preferred embodiment, the navigation bar and scrolling engine are in functional cooperation with each other. However, those skilled in the art will recognize from the disclosure herein that the present invention is not limited to such combination. Each feature may be used separately while still providing enhanced user interaction capabilities. Namely, the user may use the navigation bar or like interface to navigate an information space without scrolling. Similarly, the user may wish to use an adaptive scrolling method such as those implemented by the scrolling engine but in an environment that does not require or provide a navigation bar. One of many scrolling methods may be used, and the system is intended to allow the use of new scrolling methods.

Further according to the preferred embodiment of the present invention, the information space 302 is retrieved from the Internet and stored locally in the memory 106. However, those skilled in the art will recognize that the present invention is not limited thereto. Content data may be obtained from a variety of sources including disk storage of any type that functions with or without a network connection.

In another aspect of the present invention, the overall architecture can detect the configuration of the user's computer and browsing setup using commonly available detection techniques. If the user's computer is not properly equipped to run the full version of the site, then the architecture will provide the user with an aesthetically similar, but functionally simpler version. In this "lite" site, content pages are changed using the traditional method of refreshing the page as this technique does not animate, slide, or show intermediate pages. Alternatively, a user who is capable of using the "full" site, but does not wish to wait for the entire site to download can also choose to view the site in the traditional format.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computer-implemented method for navigating an information space that includes a plurality of content pages for display on a screen, the content pages being oriented relative to one another in a spatial structure, said method comprising:

displaying a graphical object comprising a plurality of first-level items, each first-level item associated with a respective first-level page and at least one first-level item comprising a plurality of second-level items associated with a plurality of second-level pages, said first and second level items spatially arranged according to the relative orientation of their respective first and second level pages;

selecting a first-level item of said graphical object such that a first-level page associated with said first-level item is displayed on said display screen;

moving from said first-level item to another first-level item of said graphical object such that another first-level page associated with said another first level item is displayed on said display screen and such that said graphical object remains displayed on said display screen; and displaying other first level pages associated with first-level items located between said first-level item and said another first-level item of said graphical object, between the display of said first level page and said another first level page, thereby providing visual cues as to the movement within the information space.

2. The method according to claim 1, wherein said another first-level page is displayed in response to said another first-level item being selected on said display screen.

3. The method according to claim 1, wherein other first-level items located between said first level item and said another first-level item of said graphical object are viewed while traversed at a predetermined speed during the moving operation.

4. The method according to claim 3, further comprising scrolling on said display screen the respective first-level pages corresponding to said other first-level items during the moving operation.

5. The method according to claim 4, further comprising moving from said another first-level item to a second-level item via said one first-level item such that a second-level page associated with said second-level item is displayed on said display screen.

6. The method according to claim 5, further comprising scrolling on said display screen the respective first-level and second-level pages corresponding to first-level and second level items located between said another first-level item and said second-level item at said predetermined speed during the moving operation.

7. The method according to claim 6, further comprising distinguishing each of the first-level and second-level items on said display screen when traversed during the moving operation.

8. The method according to claim 5, comprising displaying other first and second-level pages associated with said first and second-level items located between said another first-level item and said second-level item of said graphical object.

9. The method according to claim 1, further comprising distinguishing said another first-level item on said display screen.

10. The method according to claim 1, wherein said first-level and second-level pages are arranged in a memory as a two-dimensional matrix, and wherein each of the first-level and second-level pages is identified by an address for calculating an offset between a starting position and an ending position corresponding to said first-level item and said another first-level item, respectively, of said graphical object.

11. The method according to claim 1, further comprising displaying said second-level items as another graphical object if said one first-level item associated with said second-level items is selected for display on said display screen.

12. The method according to claim 11, wherein said graphical object is displayed on said display screen as a first rectangular bar, and wherein said another graphical object is displayed on said display screen as a second rectangular bar differently situated with respect to said first rectangular bar.

13. The method according to claim 1, comprising displaying other first level pages associated with first level items located between said first level item and said another first level item in a sequence relative to the spatial orientation of the content pages.

14. The method according to claim 13, comprising displaying other first level pages associated with first level items located between said first level item and said another first level item at a predetermined speed.

15. A computer-implemented system for navigating an information space that includes a plurality of content pages, the content pages being oriented relative to one another in a spatial structure, said system comprising:

an input device for entering information to said system;

a display screen for displaying the entered information and said plurality of pages; and a programmable controller causing said display screen to display a graphical object comprising a plurality of first-level items, each first-level item associated with a respective first-level page and at least one first-level item comprising a plurality of second-level items associated with a plurality of second-level pages, said first and second level items spatially arranged according to the relative orientation of their respective first and second level pages, said programmable controller being operative to select a first-level item of said graphical object such that a first-level page associated with said first-level item is displayed on said display screen, said programmable controller being further operative to select another first-level item of said graphical object such that another first-level page associated with said another first-level item is displayed on said display screen, and said programmable controller being further operative to display other first-level pages associated with first-level items located between said first-level item and said another first-level item of said graphical object, between the display of said first level page and said another first level page, while said graphical object remains displayed on said display screen, thereby providing visual cues as to the movement within the information space.

16. The system according to claim 15, wherein said programmable controller is operative to display said other first-level pages associated with first level items located between said first-level and said another first-level item of said graphical object at a predetermined speed.

17. The system according to claim 16, wherein said programmable controller is further operative to cause said display screen to scroll the respective first-level pages corresponding to said other first-level pages corresponding to said other first-level items during the display operation.

18. In a computer-implemented system including an input device, a programmable controller, a display screen and a storage medium for storing program code executable by said programmable controller for navigating an information space that includes a plurality of content pages for display on a display screen, the content pages being oriented relative to one another in a spatial structure, the program code comprising:

first program code means for displaying a graphical object comprising a plurality of first-level items, each first-level item associated with a respective first-level page and at least one first-level item comprising a plurality of second-level items associated with a plurality of second-level pages, said first and second level items spatially arranged according to the relative orientation of their respective first and second level pages;

second program code means for selecting a first-level item of said graphical object such that a first-level page associated with said first-level item is displayed on said display screen;

third program code means for moving from said first-level item to another first-level item of said graphical object such that another first-level page associated with said another first-level item is displayed on said display screen and such that said graphical object remains displayed on said display screen; and fourth program code means for displaying other first-level pages associated with other first level items located between said first-level item and said another first-level item of said graphical object, between the display of said first level page and said another first level page, thereby providing visual cues as to the movement within the information space.

* * * * *